US011506556B2

(12) United States Patent
Willcox et al.

(10) Patent No.: US 11,506,556 B2
(45) Date of Patent: Nov. 22, 2022

(54) SINGLE-USE PLASTIC PRESSURE SENSOR

(71) Applicant: Rosemount Inc., Shakopee, MN (US)

(72) Inventors: Charles R. Willcox, Chanhassen, MN (US); Jason H. Rud, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 104 days.

(21) Appl. No.: 17/038,789

(22) Filed: Sep. 30, 2020

(65) Prior Publication Data

US 2022/0099514 A1 Mar. 31, 2022

(51) Int. Cl.
*G01L 9/00* (2006.01)
*G01L 19/04* (2006.01)
*G01L 9/12* (2006.01)
*G01L 9/04* (2006.01)

(52) U.S. Cl.
CPC .............. *G01L 9/12* (2013.01); *G01L 9/0044* (2013.01); *G01L 9/04* (2013.01)

(58) Field of Classification Search
CPC .... G01L 9/00–12; G01L 9/0044; G01L 19/04
See application file for complete search history.

(56) References Cited

U.S. PATENT DOCUMENTS

| | | | | |
|---|---|---|---|---|
| 3,149,492 A | * | 9/1964 | Weinberg | A61B 5/021 73/726 |
| 3,937,087 A | * | 2/1976 | Heggie | F02M 65/003 73/726 |
| 4,843,887 A | * | 7/1989 | Engeler | G01L 23/24 73/730 |
| 4,976,151 A | * | 12/1990 | Morishita | G01L 9/0004 73/728 |
| 6,463,813 B1 | * | 10/2002 | Gysling | G01L 9/0026 73/579 |
| 7,921,718 B2 | * | 4/2011 | Malmstrom | A61M 5/16854 73/700 |

(Continued)

FOREIGN PATENT DOCUMENTS

WO 2007016865 A1 2/2007

OTHER PUBLICATIONS

Potapov, A. A., & Beyer, R. (1992), Dynamic dielectric effect in liquids at low flow rates, Soviet physics, JETP, 74(3), 477-480.

(Continued)

*Primary Examiner* — Nguyen Q. Ha
(74) *Attorney, Agent, or Firm* — Christopher R. Christenson; Kelly, Holt & Christenson PLLC (57) ABSTRACT

A polymeric fluid sensor includes an inlet configured to receive fluid and an outlet. A polymeric tube is fluidically interposed between the inlet and the outlet and has a first sensing location with a first sidewall thickness and a second sensing location, spaced from the first sensing location, with a second sidewall thickness. A sleeve is disposed about the polymeric tube. The first sidewall thickness is less than the second sidewall thickness and a first sensing element is disposed at the first location and a second sensing element is disposed at the second location. In another example, the first and second sidewall thicknesses are the same and a fluid restriction is disposed within the polymeric tube between the first and second sensing locations.

18 Claims, 9 Drawing Sheets

(56) References Cited

U.S. PATENT DOCUMENTS

| | | | |
|---|---|---|---|
| 8,752,436 B2* | 6/2014 | Beck | G01L 9/0027 |
| | | | 73/756 |
| 8,893,558 B2* | 11/2014 | Davis | G01F 1/7082 |
| | | | 73/861.18 |
| 9,562,819 B2 | 2/2017 | Fadell et al. | |
| 9,909,909 B2 | 3/2018 | Schumacher | |
| 10,345,175 B2* | 7/2019 | Brugger | A61M 1/3639 |
| 10,359,415 B2 | 7/2019 | Schumacher | |
| 10,584,309 B2 | 3/2020 | Fadell et al. | |
| 10,690,261 B2 | 6/2020 | Cline et al. | |
| 10,836,990 B2 | 11/2020 | Fadell et al. | |
| 2009/0153154 A1 | 6/2009 | Hernandez et al. | |
| 2015/0226622 A1* | 8/2015 | Cheng | G01L 11/025 |
| | | | 73/730 |
| 2015/0300861 A1 | 10/2015 | Regen et al. | |
| 2016/0298068 A1 | 10/2016 | Schumacher et al. | |
| 2017/0059518 A1 | 3/2017 | Feng et al. | |
| 2017/0166852 A1 | 6/2017 | Feng | |
| 2019/0078952 A1 | 3/2019 | Pepin et al. | |
| 2019/0101467 A1 | 4/2019 | Fadell | |
| 2019/0264161 A1 | 8/2019 | Hu et al. | |
| 2019/0264163 A1 | 8/2019 | Dierker et al. | |
| 2019/0392280 A1 | 12/2019 | Fadell et al. | |
| 2021/0189319 A1 | 6/2021 | Hu et al. | |

OTHER PUBLICATIONS

Search Report and Written Opinion dated Jan. 5, 2022, for International Patent Application No. PCTUS2021/051276, 10 pages.
U.S. Appl. No. 17/749,619, application and drawings, 19 pages.
U.S. Appl. No. 17/749,481, application and drawings, 27 pages.

* cited by examiner

SINGLE-USE PLASTIC PRESSURE SENSOR

BACKGROUND

Many processes require the use of sensors in order to control the process. In some industries, these processes may involve biological or hygienic processes and thus must be kept free from contamination. Examples of sensors used for such processes include pressure sensors, temperature sensors, flow sensors, pH sensors, conductivity sensors, etc.

Biopharmaceutical manufacturers are increasingly making use of single-use disposable equipment in order to enhance efficiency, make equipment more versatile, and decrease risk of cross-contamination. Similarly, in the hygienic and food processing industry, it is becoming increasingly desirable to use single-use, or disposable, measurement equipment due to the high cost of cleaning, or concerns of maintaining sanitary conditions. In many of these applications, high accuracy is not required, which facilitates the use of materials other than metal, that are most cost effective and easier to manufacture. Further, in some instances it may be mandatory that designs be free of fill-fluids in order to avoid potential contamination of the process stream.

SUMMARY

A polymeric fluid sensor includes an inlet configured to receive fluid and an outlet. A polymeric tube is fluidically interposed between the inlet and the outlet and has a first sensing location with a first sidewall thickness and a second sensing location, spaced from the first sensing location, with a second sidewall thickness. A sleeve is disposed about the polymeric tube. The first sidewall thickness is less than the second sidewall thickness and a first sensing element is disposed at the first location and a second sensing element is disposed at the second location. In another example, the first and second sidewall thicknesses are the same and a fluid restriction is disposed within the polymeric tube between the first and second sensing locations.

DETAILED DESCRIPTION OF ILLUSTRATIVE EMBODIMENTS

In hygienic applications, there is generally a concern of process batch contamination from sensors used to monitor the process. The use of organic fill fluids (sometimes required for pressure sensing) in the sensors may address some of the toxicity concerns, but does not eliminate the potential of contamination, resulting in loss of an entire process batch. Oil-less designs for pressure sensors may address this to some extent, but still require costly cleaning. Disposable and single-use sensors eliminate cleaning costs but must be offset by a competitive disposable cost, and ease of use.

Some designs employ a plastic film interface between the process fluid and a metallic isolation diaphragm of a pressure sensing system. However, even these designs are still vulnerable to damage and the possibility of isolator fluid from the pressure sensing system generating contamination if present in the sensor, as well as sacrificing performance.

Embodiments described below generally provide a non-intrusive and non-invasive pressure sensor that is constructed from a polymeric (and preferably plastic) tube that utilizes a plurality of conductive coated regions on its exterior diameters to provide a capacitive measurement for a single-use sensing solution with no possibility of contamination. The sensor is designed in such a way that it allows a section of the tube to deflect with pressure, which deflection reduces a gap between the tube and contacts on an outer sleeve. This gap can be monitored with a capacitive measurement and referenced against a pseudo-fixed gap capacitor which is provided in a region of the tube that is more rigid and will not deform significantly with an interior pressure change. Since the sensor is developed from a polymeric tube, it may simply be coupled to tubing to direct the process stream through the sensor and then have the outlet of the sensor coupled to additional process tubing that returns the process flow back to the process. Further, it will be noted that designs provided in the below embodiments generally do not include any electronics. Accordingly, the sensors provided herein can survive sterilization cycles using steam and/or gamma irradiation that is often used in pharmaceutical and hygienic processing applications.

Figure 1:
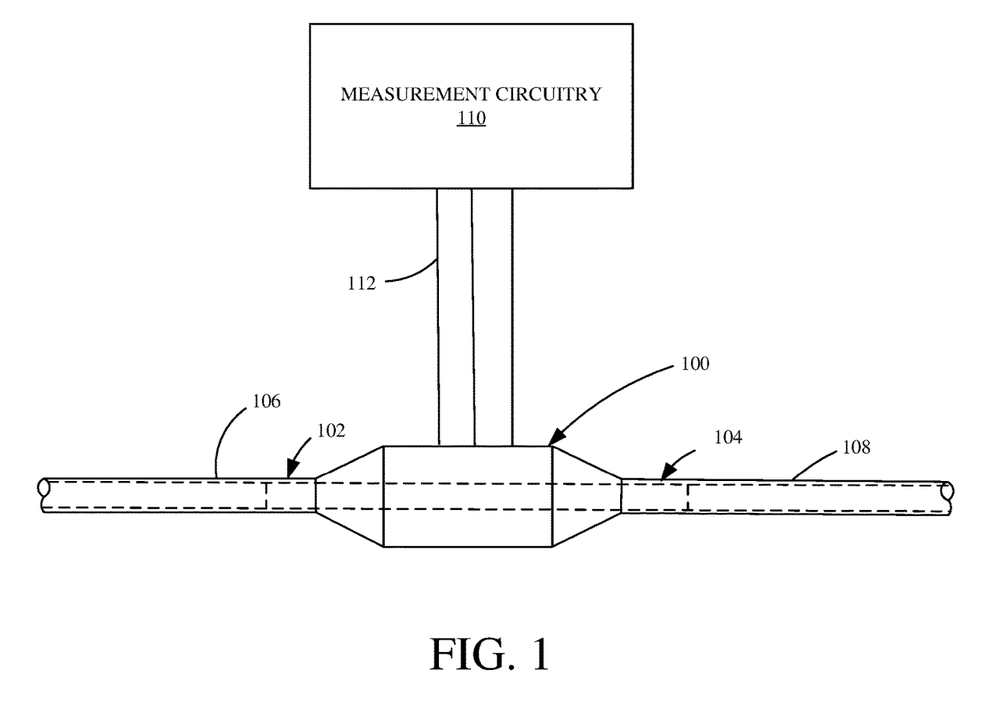
FIG. 1 is a diagrammatic view of a single-use plastic pressure sensor in accordance with an embodiment of the present invention.

FIG. 1 is a diagrammatic view of a single-use plastic pressure sensor in accordance with an embodiment of the present invention. Pressure sensor 100 generally includes a pair of tubular portions 102, 104, which are configured to couple to tubing or piping of the biopharmaceutical or hygienic process. In the illustrated example, tubing 106 is coupled to tubing portion 102 such that process fluid flowing through tubing 106 generally does not include any obstructions or intrusions within the flow path of the fluid. Similarly, tubing 108 is coupled to tubing portion 104 such that the process fluid essentially flows through the tubing sections and sensor in a substantially unobstructed and non-invasive manner. Sensor 100, as will be shown in greater detail below, includes a plurality of electrical structures that are arranged such that deflection of a tube wall can be measured and characterized in order to provide a related process fluid pressure. Since it is the deflection of the wall itself that is measured, no pressure sensor or other structure is inserted into the flow stream. Further, measurement circuitry 110 is coupled to the various electrical structures within sensor 100, by virtue of one or more conductors 112, such that measurement circuitry 110 can identify or otherwise detect a change in electrical characteristics of the structures, which change is indicative of process fluid pressure.

Figure 2:
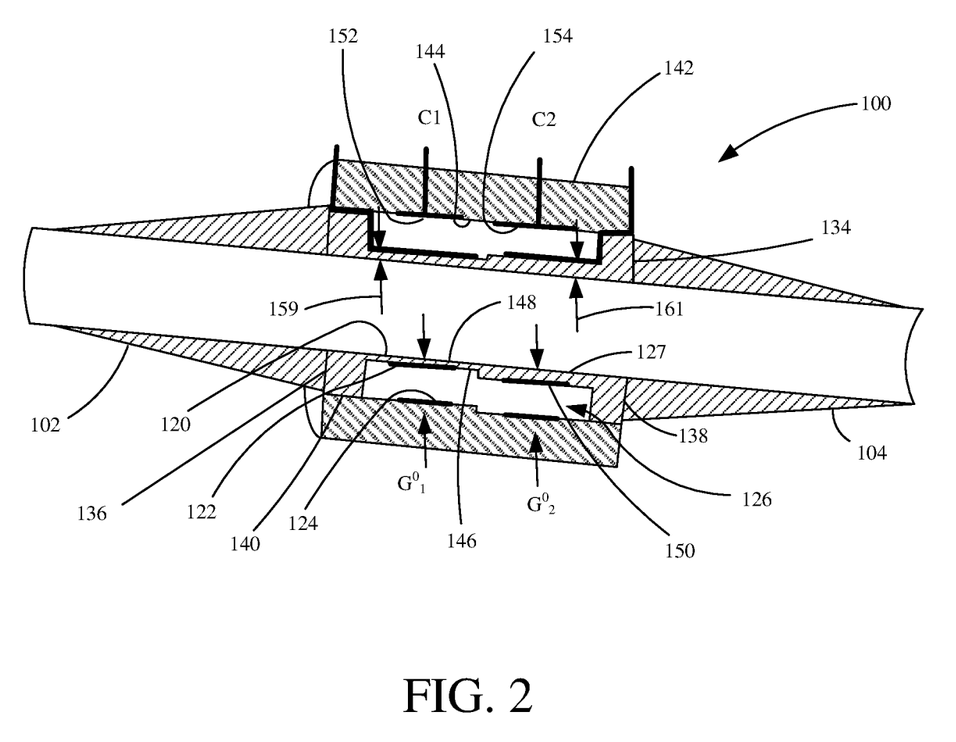
FIG. 2 is a diagrammatic cross-sectional view of a non-intrusive and non-invasive pressure sensor in accordance with an embodiment of the present invention.

FIG. 2 is a diagrammatic cross-sectional view of a non-intrusive and non-invasive pressure sensor utilizing a polymeric tube that includes conductive coated or deposited regions on its exterior to provide a capacitive measurement for single-use sensing solution in accordance with an embodiment of the present invention. Sensor 100 is designed in a way that allows a section of tube, illustrated diagrammatically at reference numeral 120 to deflect with pressure, which deflection will reduce the gap $G^0_1$ between the tube contact 122 and the sleeve contact 124. This gap $G^0_1$ can be measured or otherwise monitored with a capacitive measurement, such as using measurement circuitry 110 (shown in FIG. 1) and referenced against a pseudo fixed-gap capacitor illustrated diagrammatically at reference numeral 126, which may be formed at a region 127 of the tube that is more rigid and will not deform significantly with an interior pressure change.

As shown in FIG. 2, sensor 100 includes a pair of polymeric tubular portions 102, 104 that facilitate coupling the sensor to plastic tubing or conduit. Portions 102, 104 may be formed of any suitable polymeric material and are coupled to polymeric tube 134. As can be appreciated, the shape and structure of tubular portions 102, 104 can vary significantly in order to accommodate various different techniques for coupling the sensor to tubing or conduit. Further, each of tubular portions 102, 104 may be sealingly coupled to tube 134 in any suitable manner. However, it is preferred that tube 134 be formed of the same material as tubular portions 102, 104. Further, it is preferred that tube 134 and tubular portions 102, 104 be formed as a single unitary piece out of the same material. For example, tubular portions 102, 104 and tube 134 may be formed as a single piece of 3D-printed plastic or injection-molded plastic.

Tube 134 includes a pair of collars 136, 138 that have an outer diameter 140 that is sized to receive sleeve 142. Sleeve 142 may be affixed to outer diameter 140 of collars 136, 138 in any suitable manner, including ultrasonic welding. Alternatively, it is expressly contemplated that the sensor could be constructed using additive manufacturing technologies (e.g. 3D printing) and the tube and sleeve could be formed as a single integral component. When sleeve 140 is coupled to collars 136, 138, a pair of gaps $G^0_1$, $G^0_2$ are formed between an inner surface 144 of sleeve 142, and an outer surface 146 of tube 134. Further, a first gap $G^0_1$ is formed between a relatively thinner section 148 and inner surface 144 of sleeve 142. A second gap $G^0_2$ is formed between a relatively thicker portion 127 of tube 134 and inner surface 144 of sleeve 142. Conductive electrodes or plates 122, 150 are attached to the outer surface of tube 134 at locations 148, 127, respectively. Similarly, conductive electrodes or plates are attached to inner surface 144 of sleeve 142 at positions 152, 154.

The conductive electrodes or plates 122, 150 may be considered sensing elements as they form part of a variable capacitor having a capacitance that is based on the gap. The conductive electrodes or plates may take any suitable form including, without limitation, round pads, elliptical pads, and annular bands that extend a select amount around the surface, such as 270 degrees. Thus, a first variable capacitor is formed between the plate or conductive electrode 122 at location 148 and plate 152. A reference capacitance is formed between plate 150 and plate 154. Due to the relatively thicker portion of tubing at location 127, the reference capacitor will not significantly deflect with pressure changes within tube 134. In a preferred embodiment, gaps $G^0_1$ and $G^0_2$ are equal when the sensor is not pressurized (i.e. zero pressure). This feature is provided by using different sidewall thicknesses for the sleeve. However, other factors that affect capacitance, such as changes in temperature and thermal expansion and contraction of sensor 100, in general, will be relatively common to both capacitors. Thus, contrasting the response of sensing capacitor $C_1$ with reference capacitor $C_2$ provides a direct indication of pressure that is substantially independent of other factors.

In order to quantify how the outer diameter of a thick-walled pipe changes (denoted as $\Delta D_o$), when a pressure P is introduced inside the pipe, some assumptions are helpful. A first assumption is that the outside environment of the pipe is at ambient pressure, hence the pressure is a gauge pressure application. Under such assumption, the change in outer diameter $(\Delta D_O)$ can be calculated from Equation 1 below:

$$\Delta D_o = D_o \left\{ 2\frac{P}{E}\left[\frac{D_i^2}{D_o^2 - D_i^2}\right] \right\} \quad \text{Equation 1}$$

Where E is the Young's modulus of the pipe, and $D_i$ and $D_o$ are the inner and outer pipe diameters respectively. Because the thermal expansion of plastic and plastic-like materials is high, it is desirable to passively correct for temperature changes by way of ratiometric or differencing schemes. The example depicted in FIG. 2 is a sensor that can passively correct for temperature effects, especially at zero pressure.

To achieve passive temperature compensation, the pair of electrodes are arranged to measure the gap change at two different locations, as illustrated in FIG. 2. The gap surfaces are the plates of a parallel capacitor, which decrease as pressure inside the tube increases. Note, the tube at locations C1 and C2 has different thicknesses 159, 161, at locations 148, 127, respectively. Each of the plates are coupled to electrical leads that are operably coupled to measurement circuitry (shown in FIG. 8) to allow a controller to determine capacitance (and hence pressure). The tube expansion with temperature, at these two locations, will be the same, but the amount of gap change with pressure will be different, because the tube wall thicknesses are unequal. Thus, by subtracting signals from the two locations, a pressure signal can be extracted while being insensitive to changes in steady-state temperature.

Since the gap is proportional to the inverse of the capacitance, taking the difference between one over each capacitance, is effectively taking the difference between the two gaps $G_1$ and $G_2$ as shown in Equation 2 below:

$$\text{Output} = \frac{1}{C1} - \frac{1}{C2} = K(G_1 - G_2) = K\Delta G \quad \text{Equation 2}$$

Where K is constant. By design, $G_1=G_2=G_0$, i.e., the gaps at zero gauge pressure are the same, but their change with pressure is not the same, because the tube wall thicknesses are different. Since the gaps are the same at zero gauge pressure, the change with temperature will be the same. Consequently, there will be no change with temperature at zero gauge pressure. It can be further shown, in Equation 3 (below) that ΔG has the following approximate pressure-dependent form:

$$\Delta G(P) \approx \frac{P}{4E}\left(\frac{1}{t_1} - \frac{1}{t_2}\right)D_i^2 \qquad \text{Equation 3}$$

Where $t_1$ and $t_2$ are respective wall thicknesses of the two diameters at locations C1 and C2. Therefore, the pressure P can be obtained from a measurement of the output via Equations 2 and 3. Namely, $$P \approx \frac{4E output}{K\left(\frac{1}{t_1} - \frac{1}{t_2}\right)D_i^2} \qquad \text{Equation 4}$$

Figure 3:
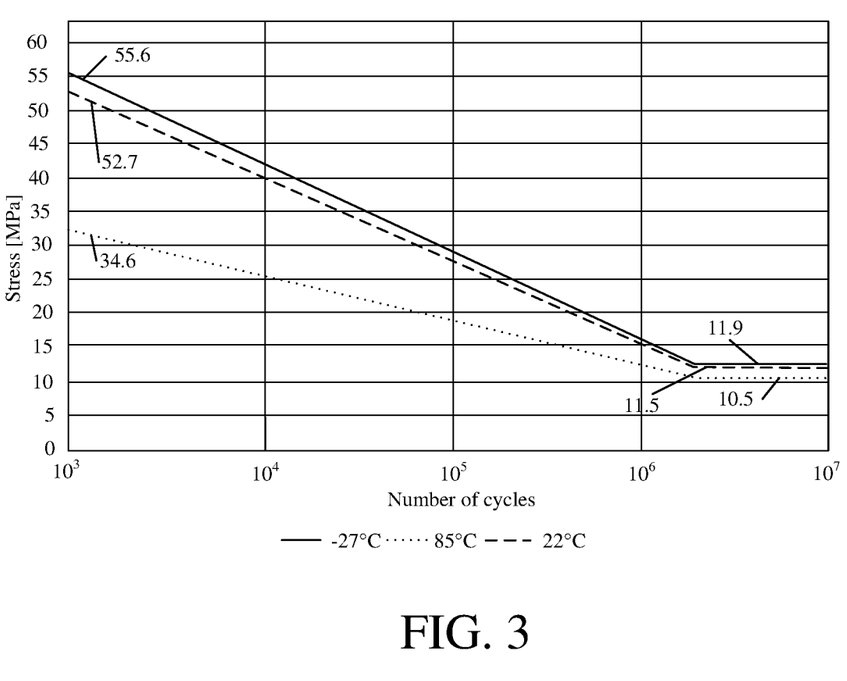
FIG. 3 is a graph illustrating stress vs. cycles at various temperatures illustrating a Wöhler curve for polycarbonate and ABS at different temperatures.
Figure 4:
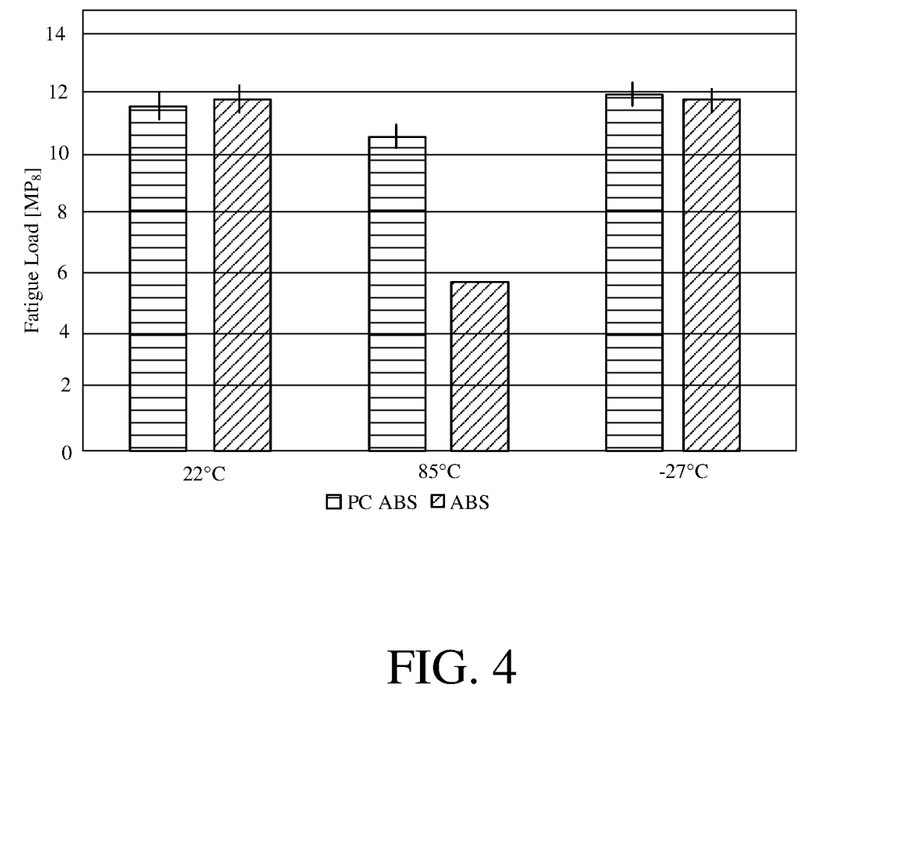
FIG. 4 is a chart depicting fatigue limits for polycarbonate and ABS at various temperatures.

The sensor design described herein preferably uses a non-toxic rigid plastic, such as polycarbonate or acrylonitrile butadiene styrene (ABS), as the primary element. Before discussing the specifics of the designs, it is necessary to address the concern of plastic creep. To manage this limitation, maximum stress encountered during the use of the sensor should be maintained below an upper level in order to survive beyond what is known as the fatigue limit. FIGS. 3 and 4 provide data on fatigue limits of polycarbonate and ABS plastic.

FIG. 3 is a graph illustrating stress in terms of megapascals versus number of cycles at various temperatures illustrating a Stress-Life, or Wohler curve for polycarbonate and ABS at different temperatures. Additionally, FIG. 4 provides various fatigue limits (expressed in terms of megapascals) for polycarbonate and ABS at various temperatures. As can be seen, the data suggests that designs using polycarbonate plastic which maintain stress levels below 10.3 megapascals (approximately 1500 PSI) should survive long-term cyclic stress operation without creep. Thus, it should be possible to construct pressure sensors in plastic using 3D printing or injection molding methods that will survive long use provided stresses remain below fatigue limit levels.

Utilization of a plastic sensor provides many benefits. First, there are generally no internal dead zones or step changes or material transitions through the sensor body. Further, at least with respect to polycarbonate, the plastic has a 50× lower Young's modulus than 304 stainless steel. This difference provides significantly more deflection per PSI. Additionally, polycarbonate is electrically insulating with a dielectric constant of approximate 3. Further, the plastic sensors facilitate incorporation of built-in over pressure stops and mounting brackets. Finally, another benefit of a plastic sensor is that it is generally non-toxic.

Thus far, embodiments have described a plastic pressure sensor that provides an electrical response that is indicative of a pressure of fluid flowing through the tube. However, additional properties of the fluid can also be sensed or otherwise determined using similar techniques.

Figure 5:
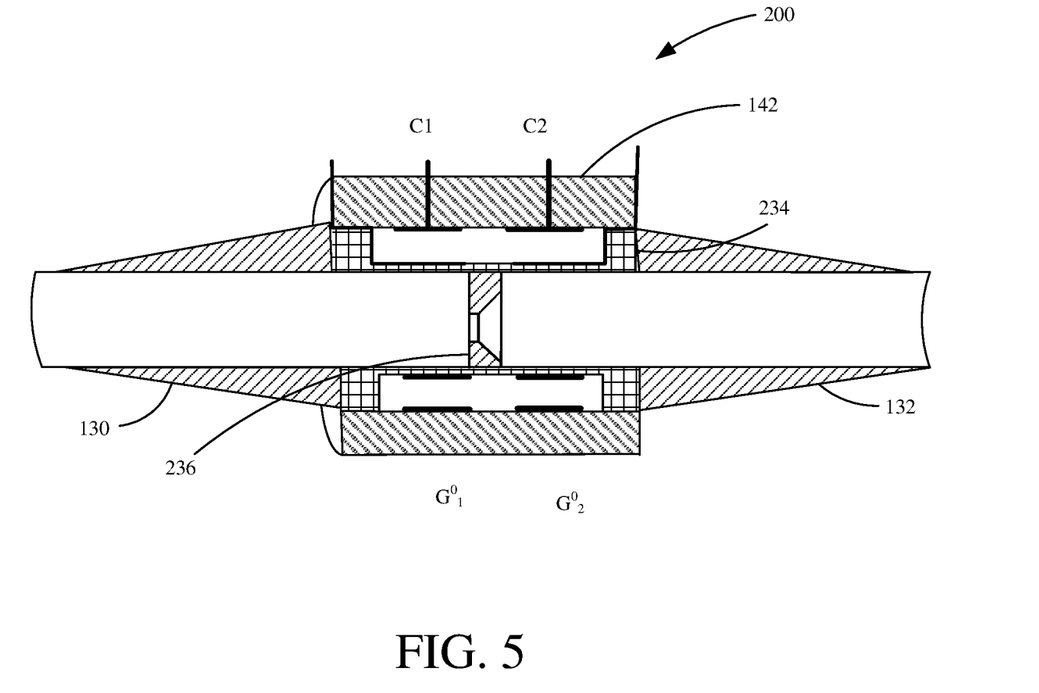
FIG. 5 is a diagrammatic view of a single-use plastic mass flow sensor in accordance with an embodiment of the present invention.

FIG. 5 is a diagrammatic view of a single-use plastic mass flow sensor in accordance with an embodiment of the present invention. Sensor 200 bears many similarities to sensor 100, and like components are numbered similarly. The main difference between sensor 200 and sensor 100, however, is that tube portion 234 of sensor 200 includes a plastic orifice plate 236 inside tube 234 separating the two capacitance regions C1 and C2. Additionally, unlike sensor 100, the wall thicknesses at locations C1 and C2 of the tube are the same on both sides of the sensor. A pressure difference arises across orifice plate 236 when flow is present, with the mass flow being proportional to the square root of the pressure difference. Thus, the square root of the output as defined in Equation 2 (above) scaled by the appropriate constants, is proportional to the mass flow through tube 234. Additionally, since the capacitances formed at locations C1 and C2 are both affected by temperature in the same way, sensor 200 will still be substantially immune to effects of temperature changes.

Another fluid property that may be measured using techniques described herein is the conductivity of the fluid itself. Using an alternating current (AC) excitation of the capacitor electrodes, the reactive and dissipative properties of the fluid's dielectric and conductivity properties can be determined. Specifically, a fluid's conductivity can be determined from a measurement of the capacitance ESR or series equivalent resistance. The bulk conductivity denoted by σ will be related to a measured value of ESR through Equation 5 below:

$$\sigma = \in (2\pi f)^2 C \cdot ESR \qquad \text{Equation 5}$$

Where ∈ is the dielectric permittivity, C is the capacitance, and f is the excitation frequency. Note, the measurement assumes knowledge of the dielectric permittivity, frequency, as well as the capacitance.

Yet another fluid property that may be determined using embodiments and techniques described herein is the fluid flow rate. The dielectric properties of a fluid have been observed to vary with flow rate. For example, a paper entitled, "Dynamic Dielectric Effect in Liquids at Low Flow Rates," by A. A. Potapov, Irkutsk Scientific Center, Siberian Department, Academy of Sciences USSR (submitted 18 Apr. 1991), Zh. Eksp. Teor. Fiz 101, 895-900 (March 1992), demonstrated the phenomenon and proposed the dielectric-flow effect is tied to a partial orientation of the liquid's molecules such that their long axes tend to line up with the direction of the liquid flow. This, in turn, will affect the dielectric property of the fluid, which can be measured. The effect, which the paper calls, a dynamic dielectric effect, has been observed in both polar and non-polar liquids. Accordingly, in fluids where the conductivity is substantially constant, variations in the dielectric permittivity may be deemed to be indicative of changes in the fluid flow rate using the above effect.

Figure 6:
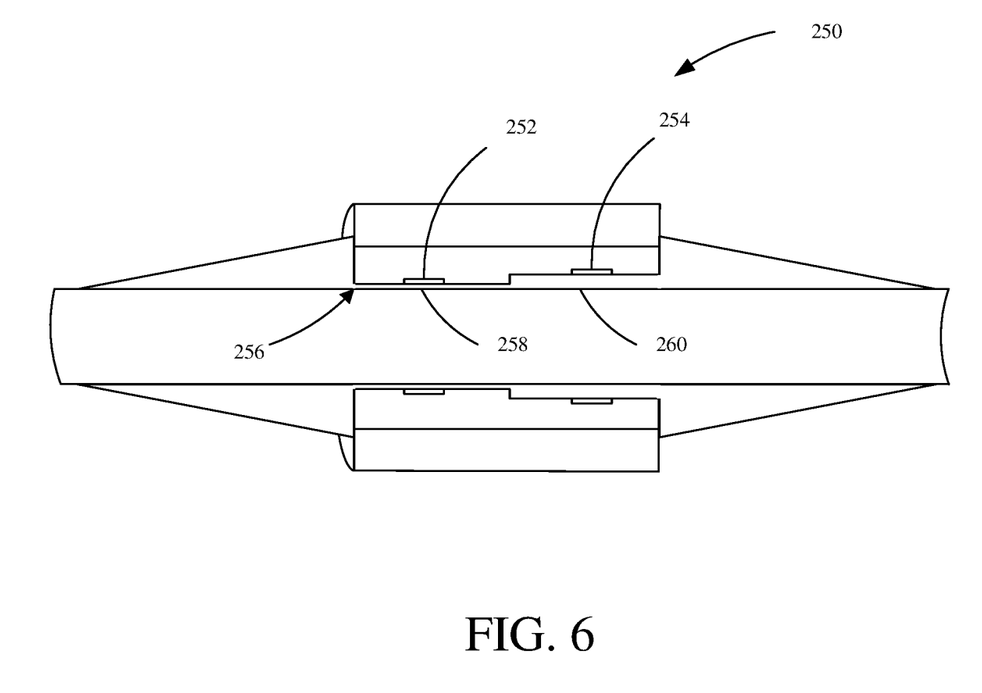
FIG. 6 is a diagrammatic view of a single-use plastic fluid sensor in accordance with another embodiment of the present invention.

FIG. 6 is a diagrammatic view of a single-use plastic fluid sensor 250 in accordance with another embodiment of the present invention. While embodiments thus far have generally utilized capacitive plates to sense tubing deformation (i.e. gap change), embodiments can be practiced that sense the tubing's deformation in response to fluid pressure in other ways. FIG. 6 illustrates a pair of strain gauges 252, 254 that are coupled to tube wall 256 at locations 258, 260, respectively. A strain gauge is a device that has a resistance that varies with strain. Often, a strain gauge is formed having a long, thin conductive strip in a zig-zag pattern of parallel lines. The strain gauges 252, 254 can be applied to tube wall 256 or manufactured into tube wall 256. Further, strain gauges 252, 254 may be disposed to partially encircle tube wall 256 or they may encircle tube wall 256 substantially completely. However, it is preferred that strain gauges 252, 254 extend about tube wall the same amount. Since strain gauges can be susceptible to changes in temperature, the embodiment shown in FIG. 6. employs strain gauge 254 at thicker location 260 as a reference sensor. This is because location 260 will not strain (at least to the extent of location 258) with fluid pressure. Thus, changes in the signal from strain gauge 254 will be indicative of non-pressure related factors, such as temperature. This signal can then be subtracted or otherwise removed from the signal from strain gauge 252 to provide a compensated strain-related output.

Figure 7:
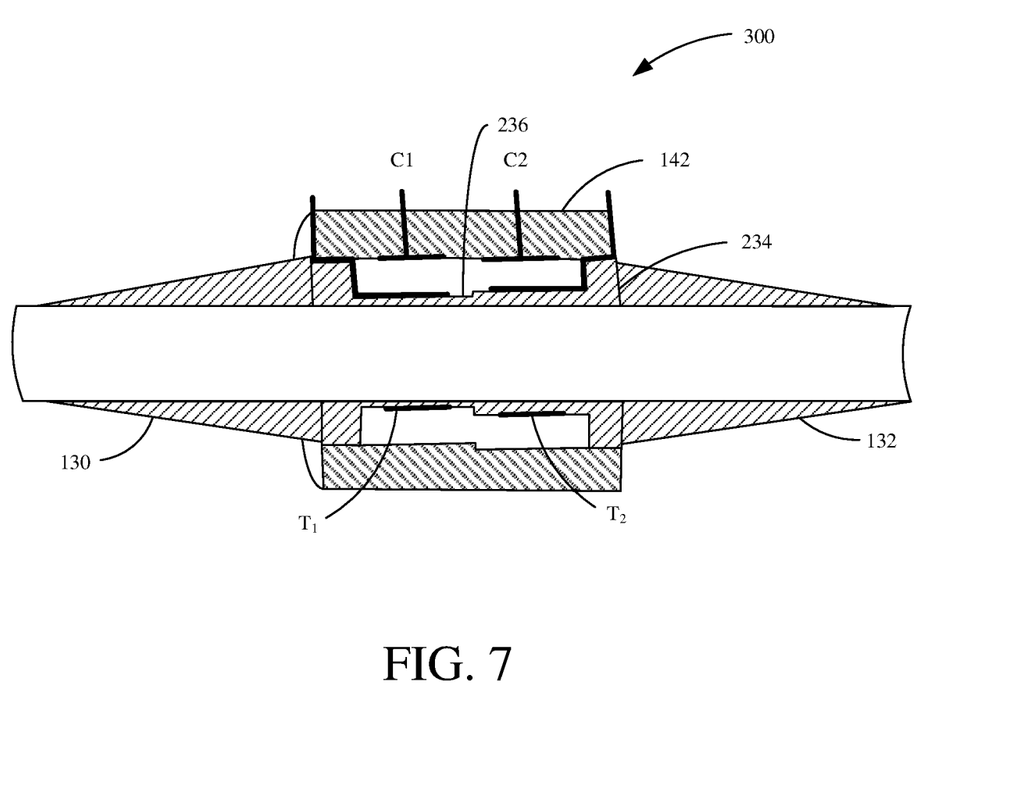
FIG. 7 is a diagrammatic view of a single-use plastic fluid sensor in accordance with another embodiment of the present invention.

FIG. 7 is a diagrammatic view of a single-use plastic fluid sensor in accordance with another embodiment of the present invention. Sensor 300 bears some similarities to sensors 100 and 200, described above, and like components are numbered similarly. Notably, sensor 300 includes a pair of temperature sensors disposed on the external surfaces of tube 334 at locations $T_1$ and $T_2$. These temperature sensors may also be considered sensing elements. Additionally, the thickness of the tube at locations $T_1$ and $T_2$ is different. This is similar to the embodiment described above with respect to FIG. 2 and sensor 100. However, having two thickness dimensions integrated into a single-use pressure sensor allows for the utilization of heat flow measurements between the two conductive plates. A simple steady-state heat flow calculation can be used to provide information about the actual internal temperature of the fluid flowing through the sensor tube. Since there are stray thermal paths within the sensor, there is no simple geometrical relationship describing the thermal impedance. However, it can be shown that to a good approximation, the process fluid obeys the following relationship as shown in Equation 6.

$$T_{process} = T_1 + (T_1 - T_2) * N \qquad \text{Equation 6}$$

Where, $T_{process}$ equals the temperature of the internal process fluid flowing through the tube, and N is a constant that can be determined experimentally.

Polycarbonate or other plastics have relatively poor thermal conductivity, but there are materials that can provide better thermal conductivity in order to improve the time response of the measurement. One example of such a material is sold under the trade designation Makrolon by Covestro AG, of Germany, which is a polycarbonate material that has some use as a heat sinks, since it provides improved thermal conductivity over other plastics.

While the temperature sensors provided in sensor 300 at locations $T_1$ and $T_2$ can take any form, such as thermocouples, thermistors, and RTDs, it is expressly contemplated that the temperature sensor element itself may be embodied within the capacitive plate. For example, the capacitive plate may be formed of a temperature sensitive metal, such as copper or nickel, and etched or otherwise patterned in such a way that it provides a measurable resistance that varies with temperature.

Figure 8:
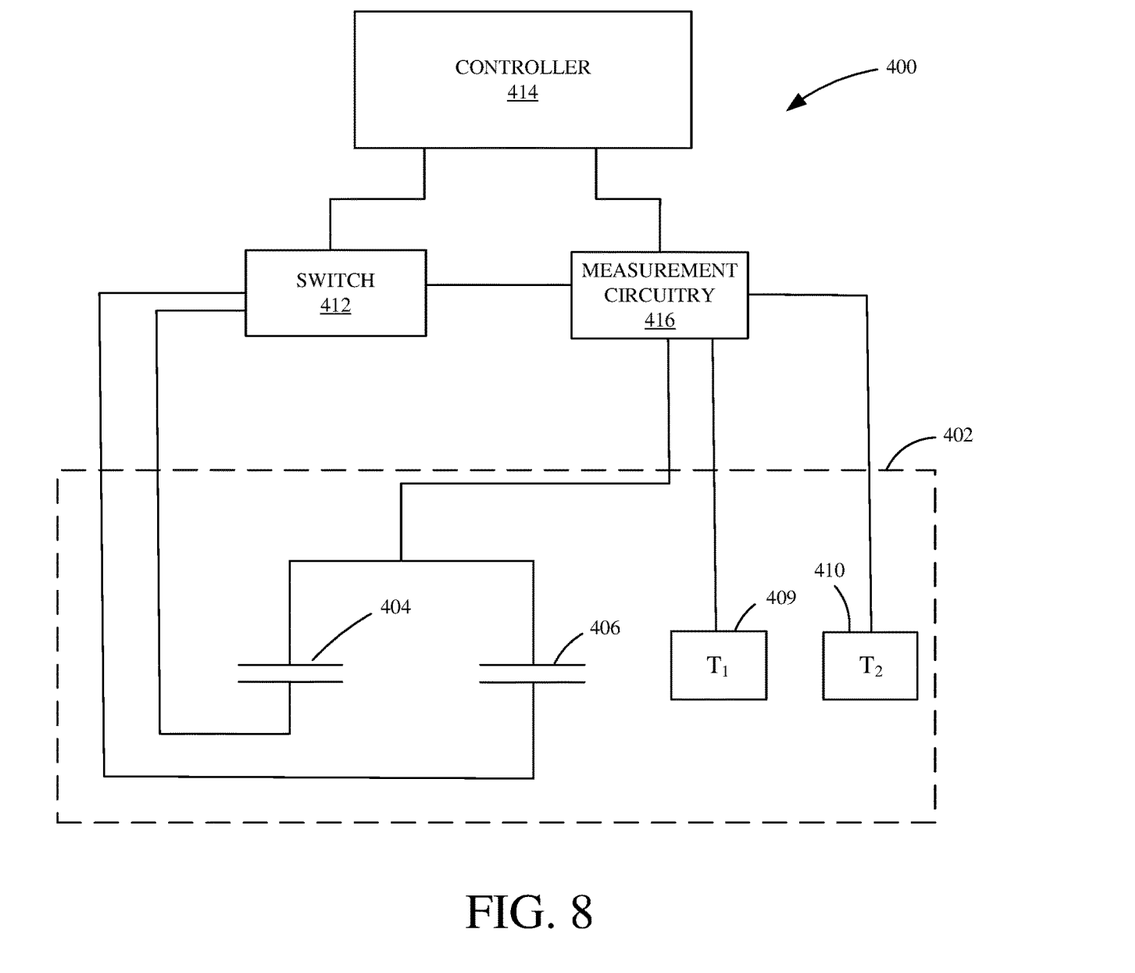
FIG. 8 is a diagrammatic view of a system for measuring a fluid property in accordance with an embodiment of the present invention.

FIG. 8 is a diagrammatic view of a system for measuring a fluid property in accordance with an embodiment of the present invention. System 400 generally includes a single-use process fluid sensor 402 illustrated diagrammatically as a dashed box around capacitors 404, 406, and temperature sensors 408, 410. As illustrated, each capacitor 404, 406 is operably coupled to a switch, or other suitable multiplexing circuitry 412 which is controlled by controller 414. Controller 414 may be any suitable electronic device that is able to operate switch 412, and interact with measurement circuitry 416, in order to detect electrical parameters of capacitors 404, 406, and temperature sensors 408, and 410. For example, controller 414 may be a microprocessor that is coupled to or includes an analog-to-digital converter that is able to determine a voltage or other electrical response of attached electrical devices. By controlling switch 412, controller 414 can interact with and measure the capacitances or capacitors 404, and 406, individually. Additionally, controller 414 may include suitable processing capabilities, such as arithmetic processing, such that the various properties described above with respect to Equations 1-6 may be calculated in order to provide a calculated process fluid parameter output, such as fluid pressure, mass flow, flow rate, conductivity, and/or temperature.

Figure 9:
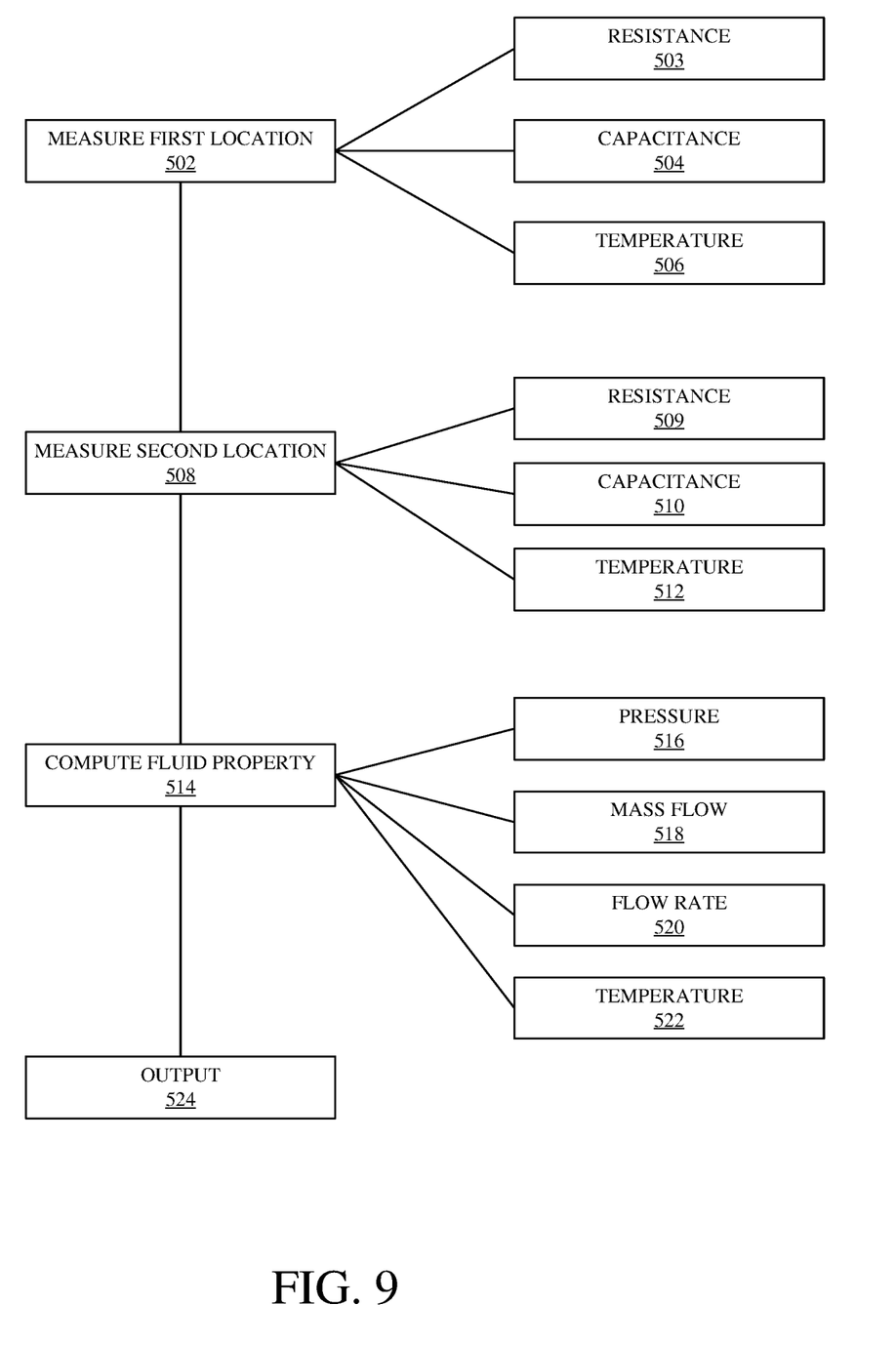
FIG. 9 is a flow diagram of a method of providing a fluid property in a biopharmaceutical or hygienic fluid processing system in accordance with an embodiment of the present invention.

FIG. 9 is a flow diagram of a method of providing a fluid property in a biopharmaceutical or hygienic fluid processing system in accordance with an embodiment of the present invention. Method 500 begins at block 502 where a measurement is obtained at a first location within a plastic tube through which the fluid flows. For example, the first measurement may be a first resistance measurement indicative of strain of a plastic tube through which process fluid flow, as indicated at reference numeral 503. Alternatively, the first measurement may be a first capacitance measurement indicative of a gap between a pair of capacitive plates at a location, such as C1 (shown in FIG. 2). This is indicated at block 504. Additionally, or alternatively, the first location measurement can be a temperature measurement as indicated at block 506. Next, at block 508, a second measurement is obtained at a second location of the plastic fluid sensor. As indicated at block 509, this second measurement may be a resistance measurement of a second strain gauge. Alternatively, as indicated at block 510, this second measurement may be a capacitance-based measurement at a location, such as location C2 (shown in FIG. 2) and/or it may be a temperature measurement 512 at the same location. Next, at block 514, a fluid property is computed based on the measurements obtained at blocks 502 and 508. As set forth above, embodiments described herein can provide measurements that can be used for the computation of a variety of fluid properties. Moreover, combinations of fluid properties, can provide higher-order indications. For example, knowing temperature of a known fluid, may allow compensations for fluid density to be determined or perhaps even the computation of the Reynolds number (Re). Regardless, the computed fluid properties may include, pressure, as indicated at block 516; mass flow, as indicated at block 518; fluid flow rate, as indicated at block 520; and temperature, as indicated at block 522. Finally, at block 524, the computed fluid property is provided as an output which may be in the form of a local output, or may be communicated to a remote device, as desired.

Although the present invention has been described with reference to preferred embodiments, workers skilled in the art will recognize that changes may be made in form and detail without departing from the spirit and scope of the invention.

What is claimed is:

1. A polymeric fluid sensor comprising:
   an inlet configured to receive fluid;
   an outlet;
   a polymeric tube fluidically interposed between the inlet and the outlet, the tube having a first sensing location with a first sidewall thickness and a second sensing location, spaced from the first sensing location, with a second sidewall thickness;
   a sleeve disposed about the polymeric tube; and
   wherein the first sidewall thickness is less than the second sidewall thickness and a first sensing element is disposed at the first location and a second sensing element is disposed at the second location.

2. The polymeric fluid sensor of claim 1, wherein the first sensing element is a capacitive plate forming a first variable capacitor with an opposing capacitive plate disposed on an inner surface of the sleeve, the first variable capacitor having a capacitance that varies with deflection of the polymeric tube at the first location.

3. The polymeric fluid sensor of claim 2, wherein the second sensing element is a capacitive plate forming a second variable capacitor with an opposing capacitive plate disposed on an inner surface of the sleeve, the second variable capacitor having a capacitance that varies with deflection of the polymeric tube at the second location.

4. The polymeric fluid sensor of claim 3, wherein the first and second variable capacitors have the same capacitance at zero pressure.

5. The polymeric fluid sensor of claim 3, wherein a distance between opposing plates of the first and second variable capacitors is equal at zero pressure.

6. The polymeric fluid sensor of claim 1, wherein the first and second sensing elements are temperature sensors.

7. The polymeric fluid sensor of claim 6, wherein the temperature sensors are incorporated into capacitive plates.

8. The polymeric fluid sensor of claim 1, wherein the tube is constructed from polycarbonate.

9. The polymeric fluid sensor of claim 1, wherein the tube is constructed from ABS.

10. The polymeric fluid sensor of claim 1, wherein the first and second sensing elements are strain gauges.

11. A polymeric fluid sensor comprising:
an inlet configured to receive fluid;
an outlet;
a tube fluidically interposed between the inlet and the outlet, the tube having a first sensing location with a first sidewall thickness and a second sensing location, spaced from the first sensing location, with a second sidewall thickness the same as the first sidewall thickness, the tube having a flow restriction disposed between the first sensing location and the second sensing location;
a sleeve disposed about the tube;
a first sensing element is disposed at the first location; and
a second sensing element is disposed at the second location.

12. The polymeric fluid sensor of claim 11, wherein the sleeve includes a plurality of capacitive plates forming capacitors with the first and second sensing elements.

13. The polymeric fluid sensor of claim 11, wherein the tube is constructed from polycarbonate.

14. The polymeric fluid sensor of claim 11, wherein the tube is constructed from ABS.

15. The polymeric fluid sensor of claim 11, wherein the first and second sensing elements are strain gauges.

16. A method of sensing a fluid property, the method comprising:
directing the fluid through a polymeric tube having a plurality of sensing locations;
sensing an electrical characteristic of a first sensing element located at a first of the plurality of sensing locations;
sensing an electrical characteristic of a second sensing element located at a second of the plurality of sensing locations;
calculating a fluid parameter based on the sensed electrical characteristics of the first and second sensing elements;
providing the calculated fluid parameter as an output; and
driving the first and second sensing elements with an alternating current excitation signal and determining fluid conductivity.

17. The method of claim 16, wherein the polymeric tube has a first sidewall thickness at the first sensing location, and a second sidewall thickness at the second sensing location, the second sidewall thickness being greater than the first sidewall thickness.

18. The method of claim 16, wherein the calculated fluid parameter is a combination of a plurality of calculated fluid parameters.

* * * * *